United States Patent [19]

Vaughn

[11] Patent Number: 4,936,004

[45] Date of Patent: Jun. 26, 1990

[54] APPARATUS FOR INSERTION OF AN OBJECT INTO A CLOSE CLEARANCE HOLE

[75] Inventor: Mark R. Vaughn, Albuquerque, N. Mex.

[73] Assignee: Board of Regents, The University of TX System, Austin, Tex.

[21] Appl. No.: 324,984

[22] Filed: Mar. 15, 1989

Related U.S. Application Data

[63] Continuation of Ser. No. 883,973, Jul. 10, 1986, abandoned.

[51] Int. Cl.⁵ .............................................. B25B 27/14
[52] U.S. Cl. ........................................ 29/271; 29/447; 29/468; 285/31; 285/381; 403/14; 403/273
[58] Field of Search .................. 29/464, 468, 447, 272, 29/271; 403/14, 273; 285/24, 27, 31, 381

[56] References Cited

U.S. PATENT DOCUMENTS

| | | | |
|---|---|---|---|
| 1,624,356 | 4/1927 | Nelson | 29/273 |
| 2,330,686 | 9/1943 | Cornell et al. | 403/333 |
| 3,155,405 | 11/1964 | Cadovius | 403/14 |
| 3,326,580 | 6/1967 | Munier et al. | 285/27 |
| 3,373,308 | 3/1968 | Perrin | 403/334 X |
| 3,606,401 | 9/1971 | Schwarz | 29/460 U X |
| 3,923,408 | 12/1975 | Belsdorf | 403/273 X |
| 3,979,994 | 9/1976 | Callignon | 403/14 X |
| 4,383,793 | 5/1983 | Weir | 414/686 |
| 4,386,868 | 6/1983 | Bluver et al. | 403/24 |
| 4,474,492 | 10/1984 | Fleitas | 403/322 |
| 4,547,096 | 10/1985 | Daigle et al. | 29/272 X |
| 4,631,973 | 12/1986 | Eley | 403/273 X |

FOREIGN PATENT DOCUMENTS

| | | | |
|---|---|---|---|
| 2257389 | 6/1974 | Fed. Rep. of Germany . | |
| 1217616 | 3/1982 | U.S.S.R. | 29/271 |
| 413410 | 7/1934 | United Kingdom | 29/271 |
| 872580 | 7/1961 | United Kingdom | 285/381 |

Primary Examiner—Charlie T. Moon
Attorney, Agent, or Firm—Arnold, White & Durkee

[57] ABSTRACT

Apparatus for insertion of an object into a close clearance hole utilizing a double taper starter system. The apparatus includes a first taper to align the object radially; a narrow section of length such that with the object tilted to the angle of the first taper, clearance in the hole is maintained; a cut-back segment of either constant diameter or reverse taper geometry; and a second taper of approximately the same size and shape as the first taper to align the object angularly. The apparatus of the invention can be advantageously used in mechanized assembly processes, the assembly of shafts into bearings, and in thermally assembled or regular interference fits.

13 Claims, 2 Drawing Sheets

APPARATUS FOR INSERTION OF AN OBJECT INTO A CLOSE CLEARANCE HOLE

This is a continuation of co-pending application Ser. No. 883,973 filed on July 10, 1986, now abandoned.

BACKGROUND OF THE INVENTION

1. Field of the Invention

The present invention relates to an apparatus for insertion of an object into a close clearance hole. Specifically, the invention relates to such apparatus utilizing a double taper starter system wherein a first taper is provided to align the part radially and a second taper is provided to align the part angularly. Apparatus in accordance with the present invention includes a first taper; a narrow section of length such that with the part tilted to the angle of the first taper, clearance in the hole is maintained;, a cut-back segment of either constant diameter or reverse taper geometry; and a second taper of approximately the same size and shape as the first taper. The apparatus of the present invention can be advantageously used in mechanized assembly processes, the assembly of shafts into bearings, and in thermally assembled or regular interference fits.

2. Description of the Relevant Art

Assembly of objects into mating holes can be quite difficult, especially when the ratio of part diameter to part diametrical clearance within the hole is greater than about 500 to 1. Until the insertion has proceeded to a significant fraction of the diameter, these close fits are subject to jamming due to misalignment. Such jamming can result in gouging and scraping the surfaces of the parts. If the parts are massive, a jammed part can be difficult to remove. Delicate bearing materials and thin surface coatings are quite susceptible to assembly damage. In applications where rapid assembly is required, such as in thermal shrink fits or interference fits and automated assembly processes, jamming of close clearance fits can be a catastrophic problem.

Perhaps the most common solution used for this problem is a single taper on either member. Although a single taper solves the radial alignment problem, once the assembly is inserted past the tapered portion the angular alignment problem is similar to an assembly with no taper. Even where both members arm tapered, the problem still exists. While it is noted that long, very shallow single tapers can decrease the frequency and severity of jamming, the excessive starter section lengths required are not acceptable for many practical applications.

Attempts by others to provide apparatus for insertion of an object into a close clearance hole have failed to provide a design suitable for use where the ratio of part diameter to part diametraly clearance within the hole is high or where it is desired to quickly assemble the parts or protect a surface coating. Accordingly, it is therefore desirable to provide an apparatus which allows the assembly of objects in a close clearance hole which can be used in rapid assembly and which minimizes the frequency and severity of jamming when parts are assembled.

SUMMARY OF THE INVENTION

The present invention provides an apparatus for insertion of an object into a close clearance hole which can be used in various assembly processes and which significantly reduces the frequency and severity of jamming due to misalignment of the assembled parts. In addition, the apparatus of the present invention allows rapid assembly of parts with minimum damage to delicate surface coatings.

The apparatus of the present invention is a starter for the insertion of an object into a hole which includes a first taper to align the part radially; a narrow section of length such that with the part tilted to the angle of the first taper, clearance in the hole is maintained; a cut-back segment of either constant diameter or reverse taper geometry; and a second, taper of approximately the same size and shape as the first taper to align the part angularly.

The first taper is used for radial alignment. After the part is turned or bored, the width of the narrow section following the taper can be adjusted by varying the length of the cut-back segment. The narrow section width is sized such that the mating part can be misaligned up to the limiting angle of the first taper without interference. The cut-back segment can be a reverse taper if necessary, especially for applications where gross initial angular misalignments are present. Once insertion has proceded beyond the cut-back segment, the second taper begins to align the part angularly. Once through the second taper, the part is sufficiently started in the hole to avoid jamming.

BRIEF DESCRIPTION OF THE DRAWINGS

The invention will further be illustrated by reference to the appended drawings which illustrate particular embodiments of the apparatus for insertion of an object into a close clearance hole in accordance with this invention.

DESCRIPTION OF THE PREFERRED EMBODIMENTS

It will be understood that the present invention can be implemented in a number of different ways within the scope of the claims appended hereto. The presently preferred embodiments of this invention will now be described.

Figure 1:
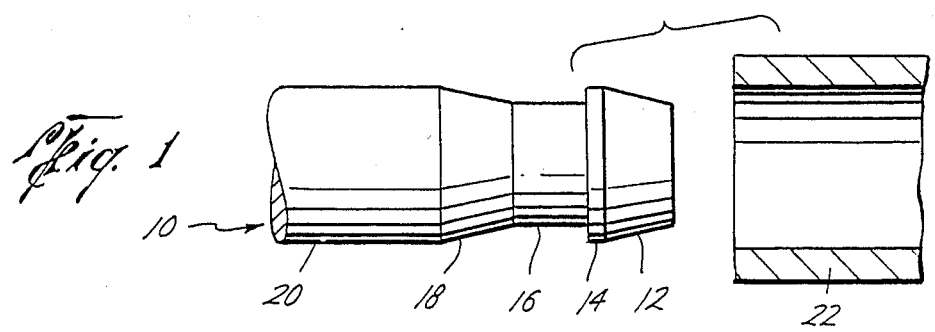
FIG. 1 is a side prospective view of the male type apparatus for insertion of an object into a close clearance hole in accordance with the present invention.

Turning now to the drawings, FIG. 1 illustrates a male type apparatus for insertion of an object into a close clearance hole 10 in accordance with the present invention. As shown in FIG. 1, apparatus 10 is basically cylindrical in shape. However, apparatus 10 could be a member of virtually any shape for insertion into a hole of a basically equivalent shape.

Apparatus 10 as shown is cylindrical in shape having first taper 12, a narrow cylindrical section 14, a cutback segment 16 and a second taper 18. Apparatus 10 is for insertion of object 10 into hole 22.

Hole 22 can be defined in any mating member or body into which object 20 is to be inserted. As can be appreciated, apparatus 10 may be a starter section and may be affixed and removed from object 20. Alternately, apparatus 10 may be unified with object 20 and be formed as an integral portion thereof through any suitable forming method.

Apparatus 10 can be employed for a variety of applications. For example, assembly of shafts into bearings of large machinery is an important application. Many times air bearing clearances are limited to that which is assembleable. In addition, assembly time is often an important factor. Interference of its, those involving a male part with a larger diameter than the female hole, are used extensively in machines. Where the part, cannot be mated by pressing the part in by force, thermal shrink fits are often used. Typically, the male part is cooled to decrease its outer diameter while the female part is heated to enlarge its inner diameter. The parts are then rapidly assembled and develop an interference fit as the temperatures equalize. If the parts jam, however, there is often a total loss to the parts.

The apparatus of the present invention has also been successfully used in therma) interference assemblies in the female version, where temperatures and tins clearances were limited by material constraints. Since time is limited in many assemble processes, the apparatus of the present. Invention has numerous applications. In the past, clearances were often enlarged to allow assembly of parts by machine. This enlargement of clearances worked to the degradation of product quality. The present invention allows use of preferred close clearances and in addition, the apparatus for the present invention has been used effectively where delicate coatings or surfaces exist on the assembled parts.

As illustrated in FIG. 1, apparatus 10 includes a first taper 12. First apex 12 is used to align the part or object 20 radially. Accordingly, first taper 12 should have its forward end small enough to allow the object to get situated in the hole. The retaining variables for the first taper are then the angle and length of the taper. If the angle of the taper is too steep, the cylindrical segment length will be prohibitively thin. Therefore, the taper length is generally from one-third to one times the diameter of the object. A large assembly has been done with a one to ten taperlength to diameter ratio. The assembly was successful but difficult to initially line up and chattered during assembly. Thus, a good general rule is that the first taperlength should be approximately one-half times the diameter of the part or object. The taper angle should be a adjusted to accommodate the length of the first taper and to satisfy forward clearance needs.

The narrow section 14 of apparatus 10 has a length such that the mating object can by misaligned up to the angle of the first taped, generally 2° to 3°, without interference. The limiting angle of the first taper is thus the maximum angle at which the object can be misaligned in the hole without interference. If L is the length of the narrow section 14, theta ($\theta$) is the taper angle of the first taper, and C is the radial clearance of the mating part within the hole, trigonometry yields that: sine $\theta = 2L$. Rearranging the equation yields that: $L = 2C/\text{sine } \theta$. Accordingly, the acceptable length of the narrow section is less than twice the radial clearance divided by the sine of the forward taper angle.

The cut-back segment 16 as shown is of length equal to that of the first taper. However, cut-back segment 16 could be of any suitable length and diameter, it being understood that the length and diameter of segment 16 influences the limiting angle of insertion as described in connection with the narrow section 14. Therefore, segment 16 should be of length and diameter to allow the limiting angle to be achieved by tilting the object to the taper angle of the first taper. As shown in FIG. 1 cutback segment 16 is of the same cylindrical diameter as the forward end of the first taper.

The second taper 18 is generally identical to the first, preferably being approximately one-half of the diameter of the object in length. The length from the large end of the first taper to the large end of the second taper of the apparatus in accordance with the present invention is preferably approximately one diameter. The overall length of the apparatus is preferably approximately one and one-half times the diameter.

The sizing heretofore discussed for the various components of the present apparatus are simply guidelines to which the actual dimensions may vary with the application and ratio of clearance to diameter. Generally, the higher the ratio of diameter to diametral clearance to the object within the hole, the shallower the taper and the longer the segments. In addition, lubrication may be applied to the object or the receiving hole to assist in the assembly, if desired.

Figure 2:
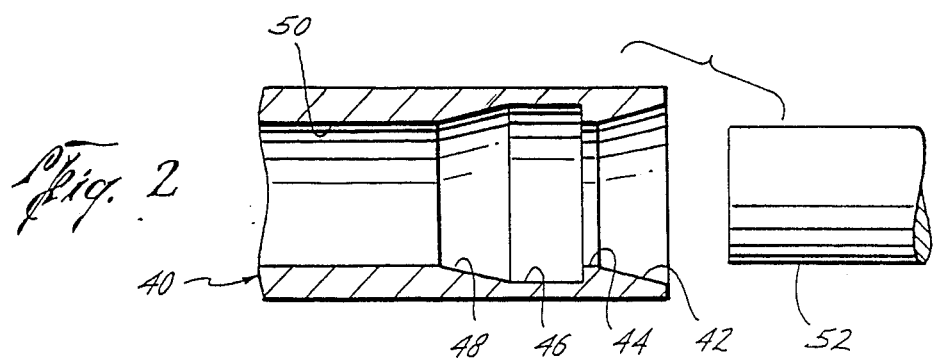
FIG. 2 is a side sectional view of a female type apparatus in accordance with the present invention.

FIG. 2 illustrates a female type apparatus in accordance with the present invention. As shown, apparatus 40 includes first taper 42, narrow section 44, cut-back segment 46 and second taper 48. In FIG. 2, part 52 is to be mated in hole 50. Similar guidelines for the sizing of the various components of the apparatus can be used as described above in connection with FIG. 1.

Figure 3A:
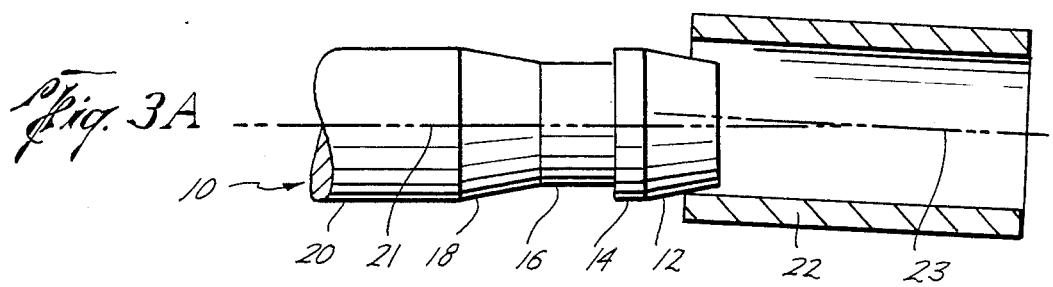
FIGS. 3A-3D are side perspective views of a male type apparatus in accordance with the present invention depicting stages of assembly using the apparatus.
Figure 3B:
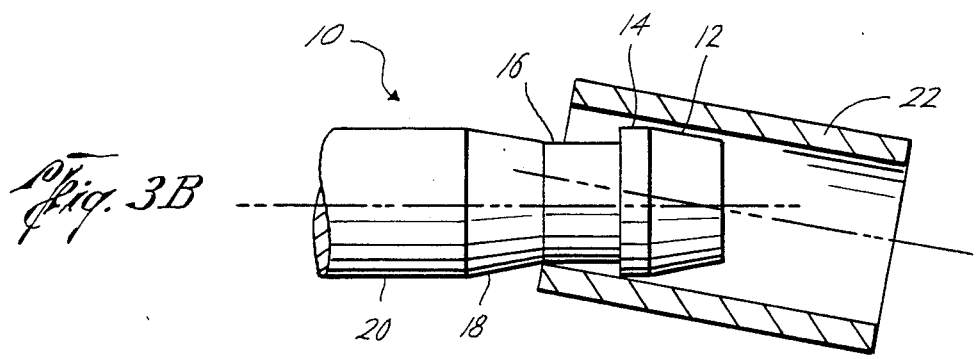
Figure 3C:
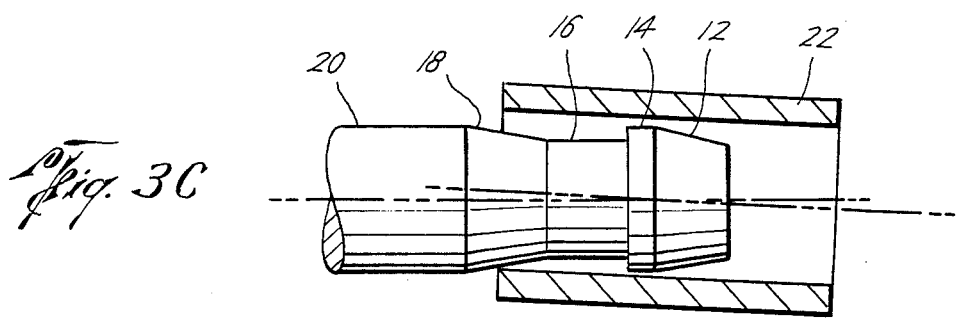
Figure 3D:
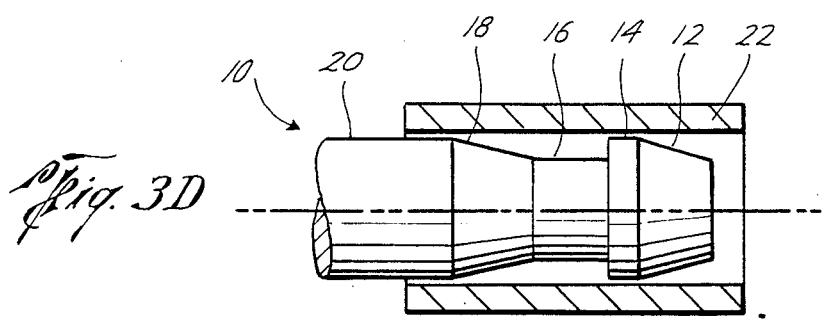

FIGS. 3A-3D illustrate the insertion of an object in a close clearance hole using the apparatus of the present invention. Broken line 21 and broken line 23 designate the centerlines of the object to be inserted and the receiving hole respectively. FIG. 3A illustrates apparatus 10 being radially aligned in the hole by first taper 12. FIG. 3B illustrates insertion of the object past cut-back segment 16 into hole 22. In FIG. 3C, second taper 18 is being used to angularly align the part in the hole 22. In FIG. 3D, part 20 is aligned in hole 22 for insertion.

Figure 4:
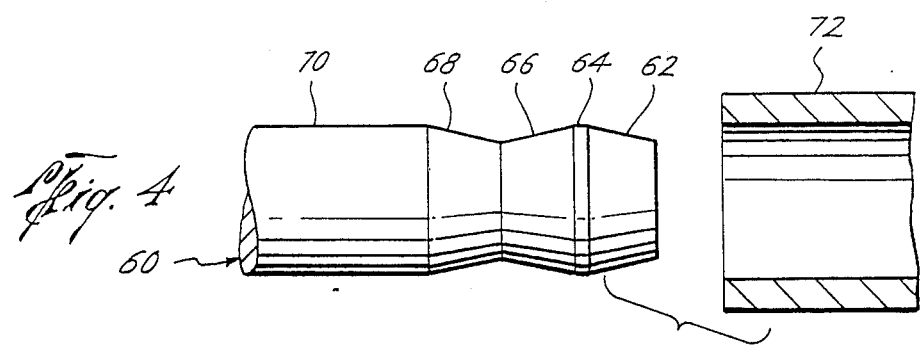
FIG. 4 is a side perspective view of an alternate embodiment of a male type apparatus with a reverse taper cut-back segment in accordance with the present invention.

FIG. 4 illustrates an alternate type male embodiment of the apparatus of the present invention. As shown in FIG. 4, apparatus 60 includes first taper 62, narrow section 64, reverse taper 66 and second taper 68. Reverse taper 66 as shown in FIG. 4 is identical in size to first taper 62 and second taper 68. However, reverse taper 66 could be of any suitable taper size with varying degrees of taper angle as long as reverse taper 66 meets the general sizing criteria as described in connection with FIG. 1.

Figure 5:
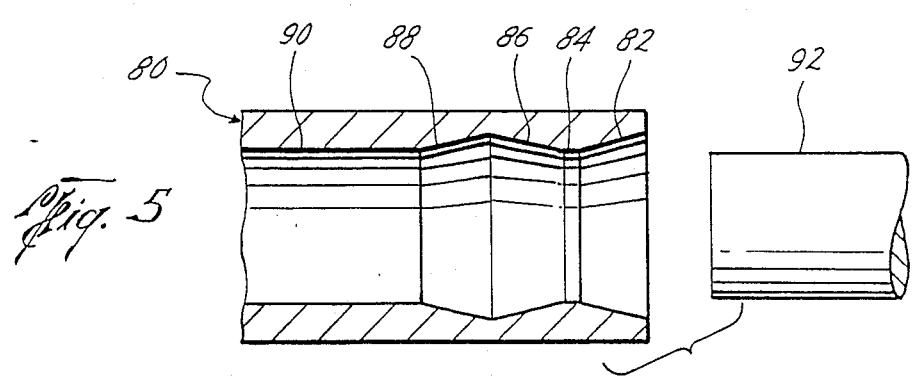
FIG. 5 is a sectional view of an alternate embodiment of a female type apparatus with a reverse taper cut-back segment in accordance with the present invention.

FIG. 5 illustrates the female type embodiment of an alternate configuration of the apparatus. As shown in FIG. 5, apparatus 80 includes first taper 82, narrow section 84, reverse taper 86 and second taper 88. Apparatus 80 is used to mate part 92 in hole 90.

In the male configuration, the apparatus permitted the assembly of a 4.0 inch diameter shaft into a hole with 0.0011 inch radial clearance. Repeated assemblies have been smooth with no detectable damage to the precision ground bearing bronze bore liner. In the female configuration, the apparatus permitted the rapid two second assembly of a 20.0 inch long, 7.0 inch diameter steel cylinder into an aluminum sleeve with an assembly clearance of only 0.006 inches. Since this was an interference fit assembly, the aluminum part was heated to provide assembly clearance. Thus, delays due to jamming might allow cooling before assembly is completed which could cause a catastrophic jam.

The present invention has been described in connection with specific embodiments. However, it will be apparent to those skilled in the art that variations from the illustrated embodiments may be undertaken without departing from the spirit and scope of the invention. For example, the sizing of the various components could be altered as described above. In addition, the apparatus could be of any size and shape for the insertion of variously sized and shaped objects into variously sized and shaped holes. These and other variations will be apparent to those skilled in the art in view of the above disclosure and are within the spirit and scope of the invention.

What is claimed is:

1. Apparatus for insertion of a cylindrical object into a close clearance hole comprising:
   a first taper section on an end of the object, the first taper section of uniformly increasing cross-sectional area of uniform shape having a largest cross-sectional area approximately equal to the cross-sectional area of the object, to align the object radially;
   a narrow axial section of a constant shape and size approximately equal to the largest cross-sectional area of the first taper section, adjacent the first taper section of a length such that with the object tilted to the angle of taper of the first taper section, clearance within the hole is maintained;
   a cut-back segment adjacent the narrow section; and
   a second taper section adjacent the cut-back segment of approximately the same size and as shape the first taper section to align the object angularly.

2. The apparatus of claim 1 wherein the cut-back segment is a reverse taper.

3. The apparatus of claim 1 wherein the first taper section length is one-half times the diameter of the object.

4. The apparatus of claim 1 wherein the first taper section length is one-half times the diameter of the object.

5. The apparatus of claim 1 wherein the length of the narrow section is less than two times the radial clearance of the object in the hole divided by the sine of the angle of taper section of the first taper section.

6. The apparatus of claim 1 wherein the length of the cut-back segment is approximately equal to the length of the first taper section.

7. The apparatus of claim 1 wherein the length of the second taper section is approximately equal to the length of the first taper section.

8. Apparatus for insertion of an object into a close clearance hole wherein the object and the hole are of substantially the same shape, the apparatus comprising:
   a first taper section on an end of the object, the first taper section of uniformly increasing cross-sectional area of uniform shape having a largest cross-sectional area approximately equal to the cross-sectional area of the object;
   a first axial segment of substantially the same shape as the first taper section adjoining the first taper section and in the same orientation and an alignment therewith, having a constant cross-sectional area approximately equal to the largest cross-sectional area of the first taper section and having a length such that clearance of the apparatus in the hole is maintained if the apparatus is tilted in the hole at an angle equal to the angle of taper of the first taper section;
   a cut-back segment of substantially the same shape as the first taper section adjoining said first segment and in the same orientation and in alignment therewith having a cross-sectional area less than the cross-sectional area of the first segment; and
   a second taper section adjoining the cut-back segment of approximately equivalent size and shape to the first taper section and in the same orientation and in alignment therewith.

9. The apparatus of claim 8 wherein the cut-back segment is of constant cross-sectional area.

10. The apparatus of claim 8 wherein the cut-back segment is of uniformly decreasing cross-sectional area, having a largest cross-sectional area approximately equal to the cross-sectional area of the first segment.

11. The apparatus of claim 8 wherein the apparatus is cylindrical.

12. A starter for aiding in inserting an object into a close clearance hole defined in a mating body comprising:
   a first taper section on an end of the object, the first taper section of uniformly increasing cross-sectional are of uniform shape having a largest cross-sectional area approximately equal to the cross-sectional area of the object, to align the object radially;
   a narrow section of a constant shape and size approximately equal to the largest cross-sectional area of the first taper section, adjacent the first taper section of a length such that with the object tiled to the angle of taper of the first taper section within the hole after insertion to the narrow section, clearance within the hole is maintained;
   a cut-back segment adjacent the narrow section; and
   a second taper section adjacent the cut-back segment of approximately the same size and shape as the first taper section to align the object angularly.

13. The starter of claim 12 wherein the starter is coupled to the distal end of the object.

* * * * *

UNITED STATES PATENT AND TRADEMARK OFFICE
CERTIFICATE OF CORRECTION

PATENT NO. : 4,936,004

DATED : June 26, 1990

INVENTOR(S) : Mark R. Vaugh

It is certified that error appears in the above-identified patent and that said Letters Patent is hereby corrected as shown below:

In claim 1, column 5, line 37, "as shape" should read --shape as--.

In claim 3, column 5, line 42, delete the word "one-half" and insert therefor --one-third to one--.

Signed and Sealed this

Seventeenth Day of March, 1992

Attest:

HARRY F. MANBECK, JR.

*Attesting Officer*   *Commissioner of Patents and Trademarks*